Figure 1:
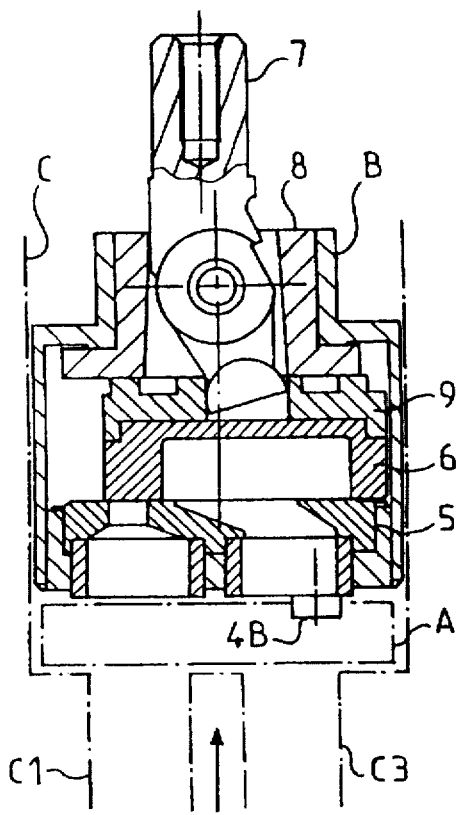

United States Patent
Caria et al.

[11] Patent Number: 5,893,386
[45] Date of Patent: Apr. 13, 1999

[54] REVERSIBLE ADAPTER FOR SYMMETRICAL MIXER TAP CARTRIDGE AND MIXER TAP INCORPORATING IT

[75] Inventors: Bernard Caria, Yerres; Yves Delaisement, Villecresnes, both of France

[73] Assignee: Norton Desmarquest Fine Ceramics, Vincennes Cedex, France

[21] Appl. No.: 08/842,099

[22] Filed: Apr. 28, 1997

[30] Foreign Application Priority Data

Apr. 30, 1996 [FR] France ................. 96 05442

[51] Int. Cl.⁶ ................................. F16K 11/078
[52] U.S. Cl. ............... 137/271; 137/625.4; 137/625.17
[58] Field of Search ................ 137/270, 271, 137/625.4, 625.41, 625.17

[56] References Cited

U.S. PATENT DOCUMENTS

| | | | |
|---|---|---|---|
| 3,674,048 | 7/1972 | Manoogian et al. | 137/270 |
| 3,823,737 | 7/1974 | Szymanski | 137/607 |
| 4,243,063 | 1/1981 | Parkinson | 137/625.41 X |
| 4,362,186 | 12/1982 | Parkinson et al. | 137/625.17 |
| 4,378,029 | 3/1983 | Parkinson | 137/625.4 |
| 4,397,330 | 8/1983 | Hayman | 137/625.41 X |
| 4,662,388 | 5/1987 | Eaton et al. | 137/270 |
| 5,095,934 | 3/1992 | Iqbal | 137/270 |
| 5,331,997 | 7/1994 | Bosio | 137/270 |
| 5,402,819 | 4/1995 | Bosio | 137/270 |
| 5,425,394 | 6/1995 | Clare | 137/270 |
| 5,806,552 | 9/1998 | Martin, Jr. | 137/625.41 X |

FOREIGN PATENT DOCUMENTS

647807 A2  4/1995  European Pat. Off.

*Primary Examiner*—John Rivell
*Assistant Examiner*—Meredith H. Schoenfeld
*Attorney, Agent, or Firm*—Thomas M. DiMauro

[57] ABSTRACT

A reversible adapter designed to be disposed between the bottom of a standard mixer tap cartridge and the bottom of a standard mixer tap body chamber, said bottoms conforming to a substantially circular common design, with two inlet locations disposed symmetrically about a diameter, includes:

- a rigid part (10) having a transverse surface (11) flanked by a skirt (12) and including two inlet locations, two half-moon shape openings (17, 18) respectively radially inside and radially outside a half-circle,
- one of two elastic material seals, the first of which includes two angularly offset chambers respectively surrounding the inlet locations and the second (40) of which includes two concentric circumferential chambers disposed on radially opposite sides of this semicircle, and each of which includes, at its end axially aligned with one of the half-moons, a web (40F, 40G) defining, facing that half-moon, a cup the depth of which increases in the direction towards the other end.

8 Claims, 5 Drawing Sheets

5,893,386

REVERSIBLE ADAPTER FOR SYMMETRICAL MIXER TAP CARTRIDGE AND MIXER TAP INCORPORATING IT

The invention concerns a reversible adapter designed to allow selective crossed or direct communication between the cold water inlet and hot water inlet passages in the base of a tap body with the inlets of a mixer tap cartridge.

A mixer tap conventionally includes a solid body in which is formed a chamber having a generally plane bottom onto which open hot and cold water inlet passages and a mixed water outlet passage. This chamber contains an assembly known as a "cartridge" incorporating, axially facing the passages in the bottom of the valve body, respective hot and cold water inlet orifices and a mixed water outlet orifice. The cartridge includes an internal mechanism with ceramic disks in contact whose respective positions, controlled by an operating lever accessible from outside the tap body, determine the relative proportions of hot water and cold water in the mixed water.

The concepts of hot water and cold water are in fact determined by the connections of the tap body to the remainder of the plumbing. The relative position of the hot and cold water inlet passages is the same in all countries: it is standard for the cold water inlet to be on the righthand side and for the hot water inlet to be on the lefthand side from the point of view of a user facing a wash basin, for example.

Various reasons have lead to the design of standard cartridges, with a generally symmetrical configuration, having two inlet orifices substantially symmetrical about a diameter and at a distance from the outlet orifice which is centered on the same diameter.

A problem arises where two taps have to be mounted back-to-back on opposite sides of a wall. This arises, for example, if it is required to exploit the fact that two bathrooms are adjacent to simplify the overall layout of the plumbing by installing a single cold water supply and a single hot water supply near the separating wall. It is not always possible to execute the plumbing in such a way that the cold water inlet is on the left hand side on both sides of the wall and the hot water inlet is on the lefthand side on both sides of the wall.

The use of standard cartridges would then require one user to reverse the movements required to mix the hot and cold water. To avoid this, a reversible cartridge has already been proposed with the bottom incorporating a cup adapted to receive one of two seals providing either direct communication or crossed communication between the inlet passages and the inlet orifices. However, this reversible cartridge has the disadvantage of being totally dedicated, with inlet orifices at different distances from the center of the bottom wall (thus there is no longer any symmetry about a diameter). This reversible cartridge also entails a specific modification to the design of the bottom of the chamber in the tap body intended to receive it, in that the inlet passages of the tap body must also be disposed asymmetrically, at different distances from the center of the bottom wall of the chamber. The seals designed to allow a selective choice of direct or crossed communication include either two openings that are substantially symmetrical about a diameter passing through the center of the seal and through the outlet orifice of the cartridge or two openings substantially transversely disposed to this diameter. As a result, not only for crossed communication but also for direct communication, there are sudden changes of path in the flow of both the cold water and the hot water (with portions of the flow path transverse to the normal direction of flow in all cases) and therefore sometimes unwanted noise.

An object of the invention is to alleviate the aforementioned disadvantages by offering the facility of reversibility without dispensing with the symmetrical arrangement either of the standard mixer tap bodies or of the standard mixer tap cartridges of the prior art, apart from shortening the cartridge in the axial direction or recessing the chamber in the axial direction, if necessary, with minimal deterioration of the flow, and therefore minimal noise, both in the direct connection mode and in the crossed connection mode, and without significantly reducing the possible flowrates.

To this end the invention proposes a reversible adapter intended to be disposed between the bottom of a standard mixer tap cartridge and the bottom of a chamber of a standard mixer tap body, said bottoms conforming to a substantially circular common design, with two inlet locations symmetrically disposed about a diameter and one outlet location centered on that diameter, said locations being disposed in a globally triangular configuration, said reversible adapter including, for either direct or crossed communication between the bottom of the cartridge and the bottom of the chamber at said inlet locations and direct communication at the outlet location:

a rigid part having a transverse surface adapted to be in contact with the bottom of the cartridge and a skirt flanking said transverse surface and adapted to extend towards the bottom of the chamber, defining a cavity, said transverse surface including, at the inlet locations, two half-moon shape openings respectively radially inside and radially outside a semicircle having a radius substantially equal to the distance between the center of the inlet locations and the center of the design, one of two elastic material seals, the first of which includes two angularly offset chambers through its entire thickness respectively surrounding the inlet locations and the second of which includes two concentric circumferential chambers on opposite radial sides of said semicircle extending angularly from one of the inlet locations to the other, each of said chambers including, at its end axially aligned with one of the half-moons, a transverse web having an angular amplitude at least equal to that of said half-moon and defining a cup facing said half-moon the depth of which increases in the direction towards the other end.

In accordance with preferred, possibly combinable, features of the invention:

the rigid part includes ribs flanking the half-moon shape openings along the semicircle, the second seal includes, between the two concentric chambers, a semicircular portion including slots adapted to cooperate with the ribs on the rigid part, the half-moon shape openings are flanked at least along the semicircle by bevels widening in the direction away from the seal, the second seal includes, between the two concentric chambers, a portion having near each cup disposed near each half-moon a bevel widening in the direction towards the outside of the adapter, the second seal includes, opposite each cup, a bevel converging in the direction towards the interior of the rigid part, the second seal includes, axially opposite each half-moon, a projection the cross-section of which is at least equal to that of the half-moon and merging through an inclined surface with that of the concentric chambers communicating with the other half-moon.

The invention also proposes a mixer tap including a tap body chamber having a bottom onto which open two inlet passages and one outlet passage, disposed symmetrically on opposite sides of a diameter, and a cartridge having a bottom with two inlet orifices axially in line with the inlet passages and one outlet orifice axially in line with the outlet passage, further comprising, between the bottom of the chamber and the bottom of the cartridge, a reversible adapter according to any one of claims 1 to 7, the transverse surface of the rigid part being in contact with the bottom of the cartridge, the half-moon shape openings axially facing the inlet openings and the inlet passages.

Note that the half-moon shape of the orifices in the rigid part allows virtually direct communication, albeit with a constriction, when the first seal is used, since these half-moon orifices are disposed axially between the inlet orifices and passages of the tap body and the cartridge. In the second seal, designed for crossed communication, the fact that the cups are at the ends of the circumferential openings contributes to guiding the flow and minimizing noise. Finally, note that in both cases there is no need for any modification of the geometry of the bottom of the chamber in the tap body or of the bottom wall of the cartridge.

Figure 2:
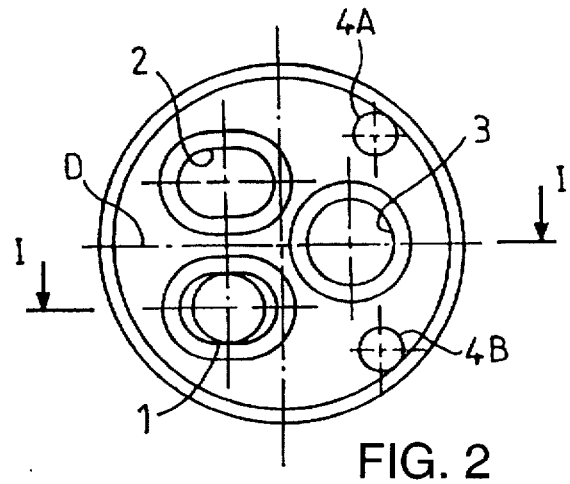
Figure 3:
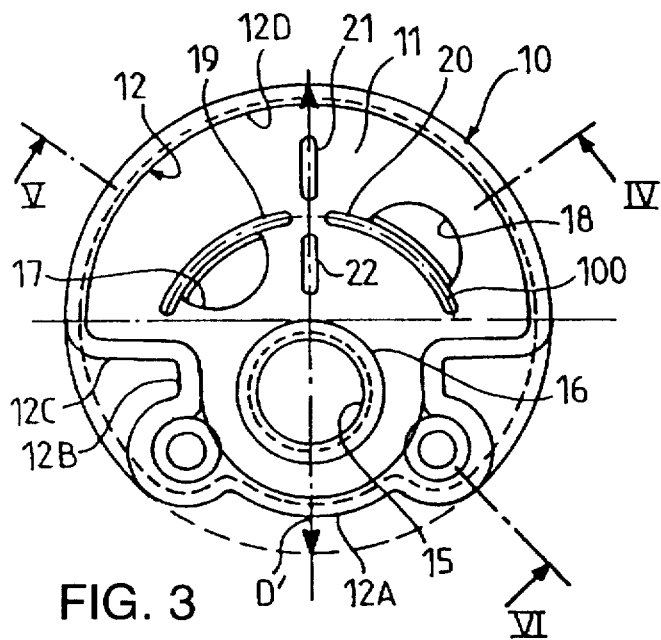
Figure 4:
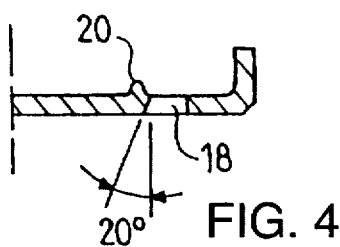
Figure 5:
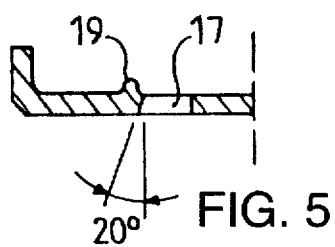
Figure 6:
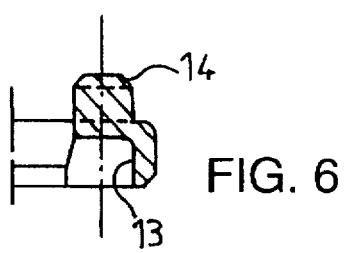
Figure 8:
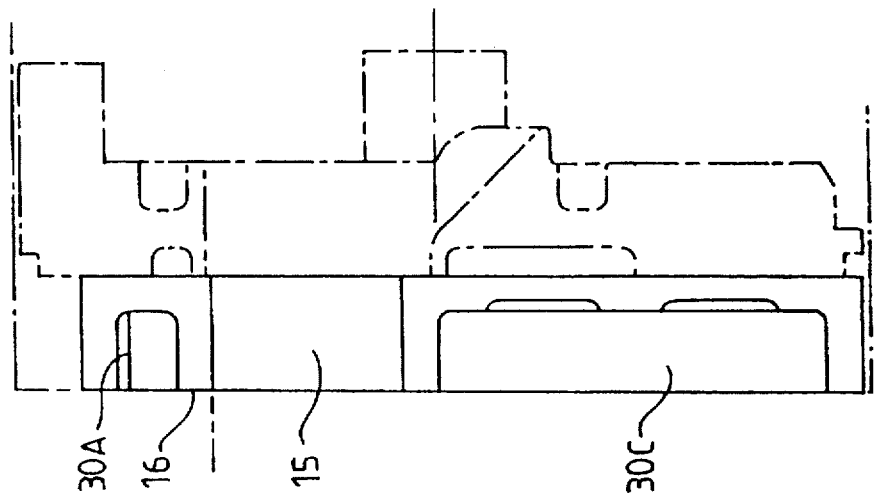
Figure 7:
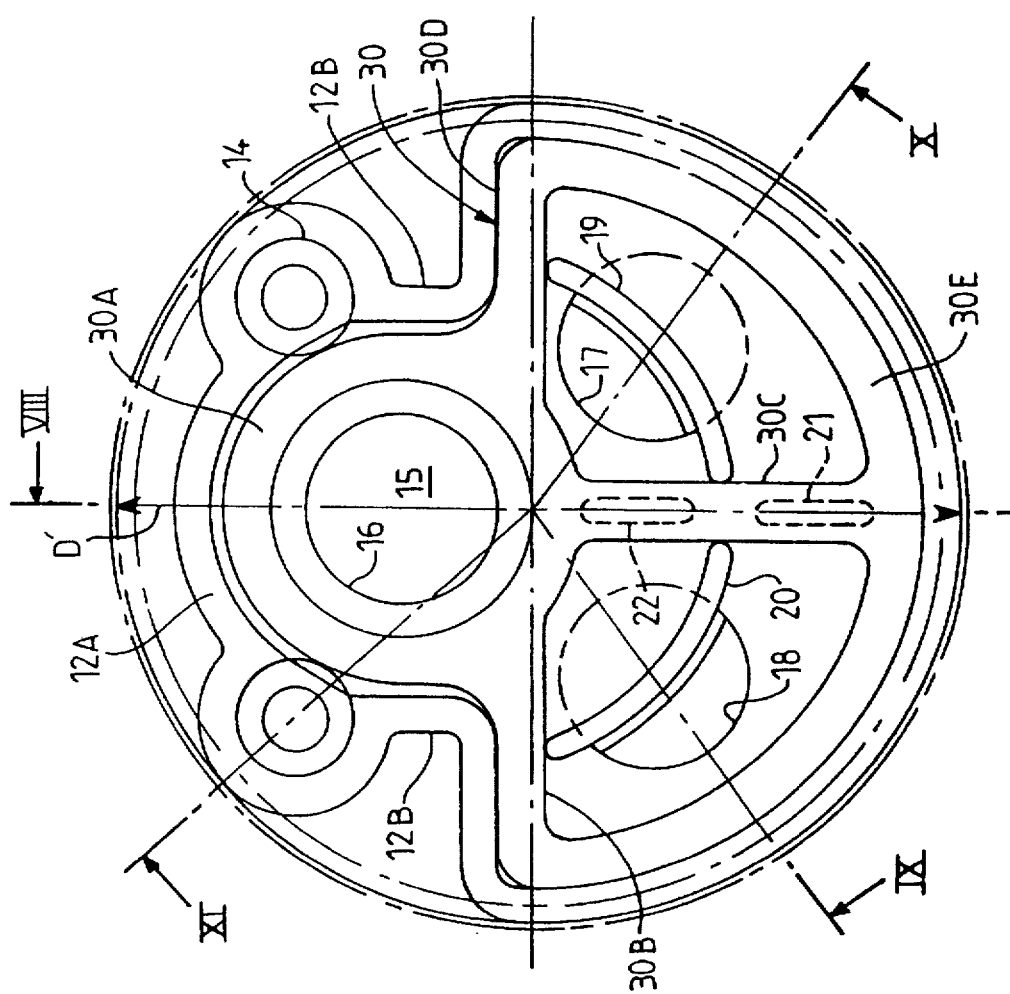
Figure 9:
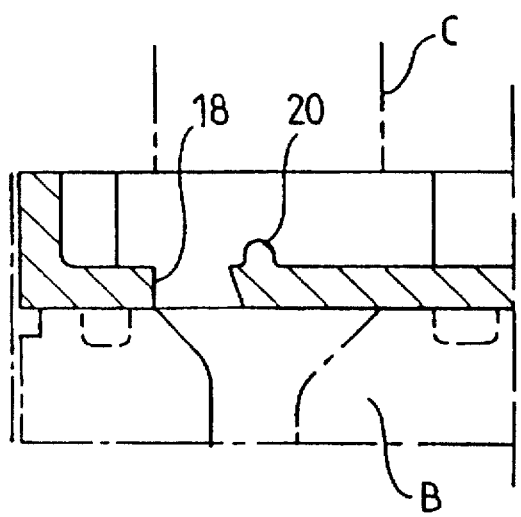
Figure 10:
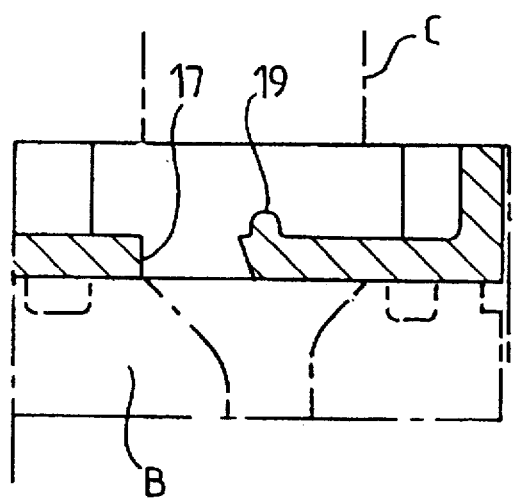
Figure 11:
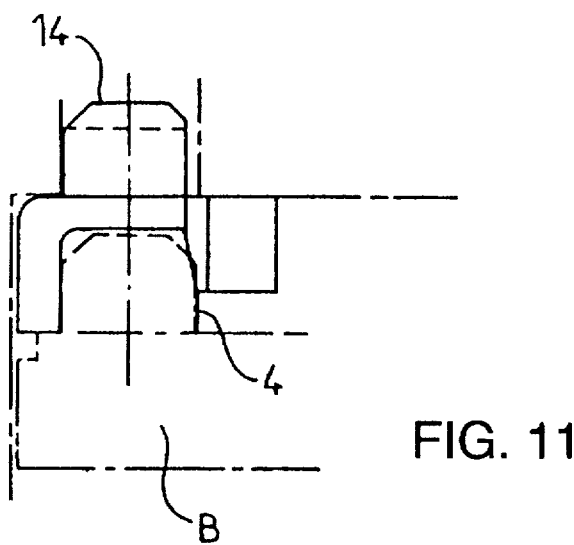
Figure 13:
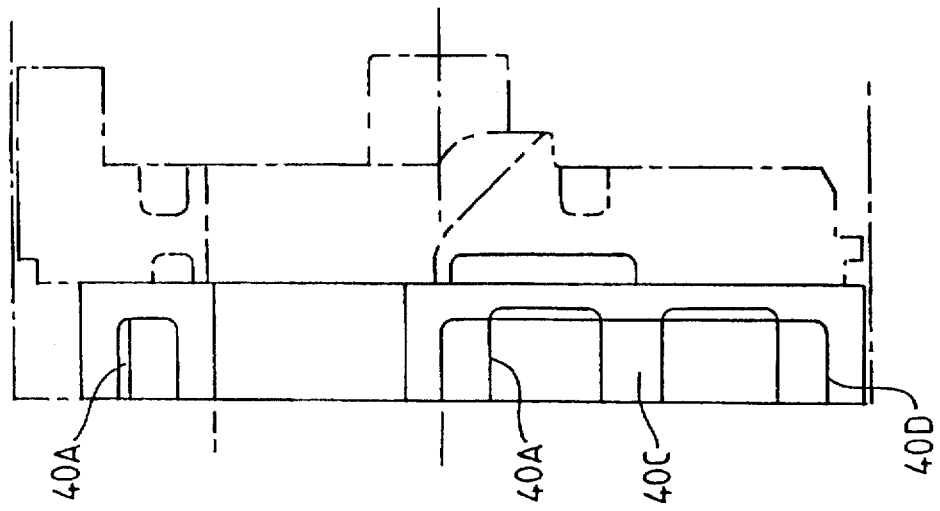
Figure 12:
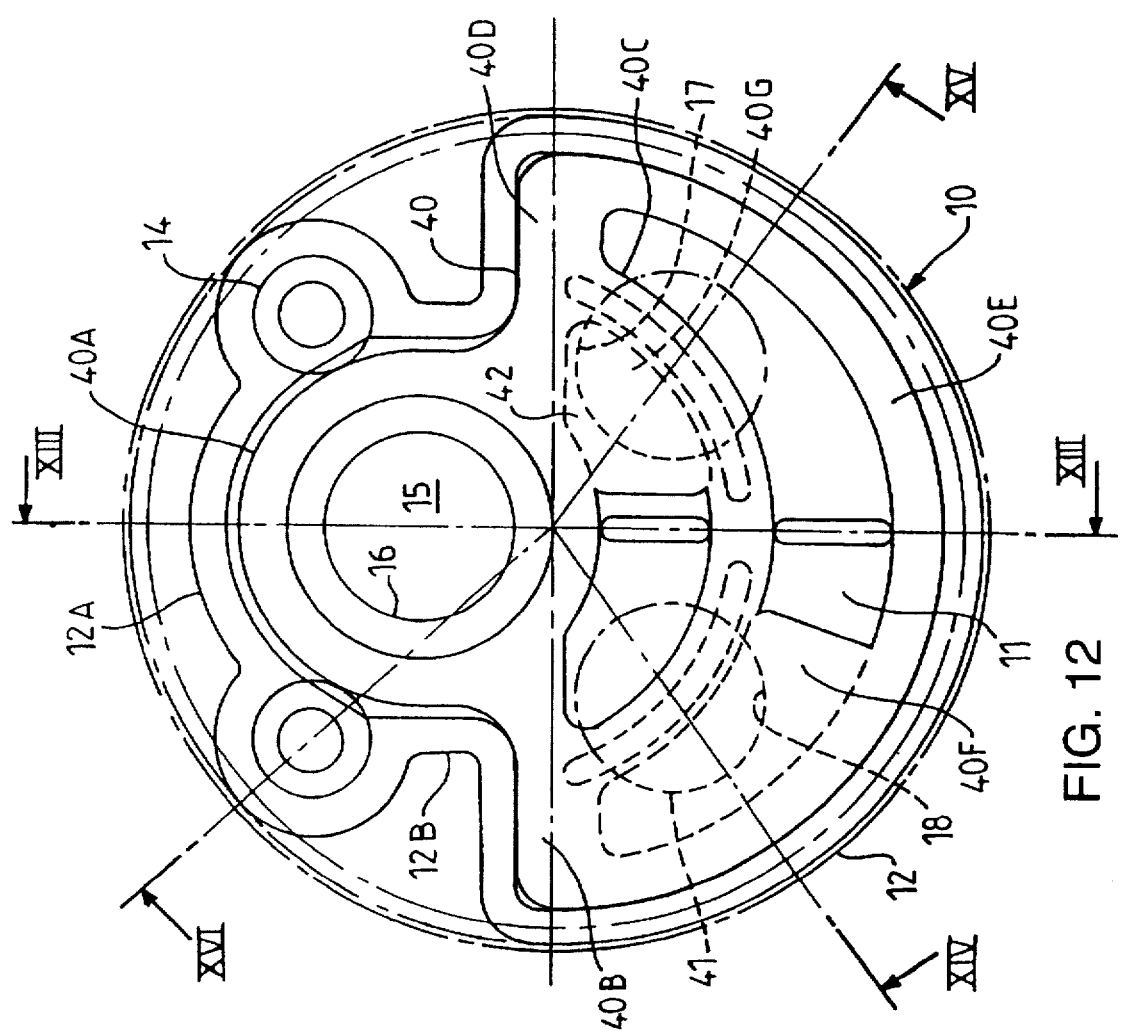
Figure 14:
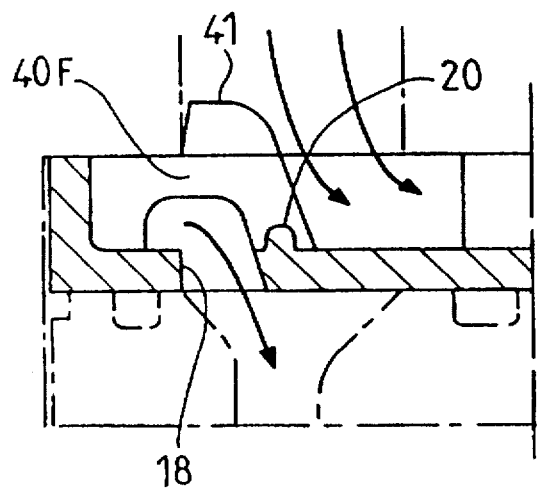
Figure 15:
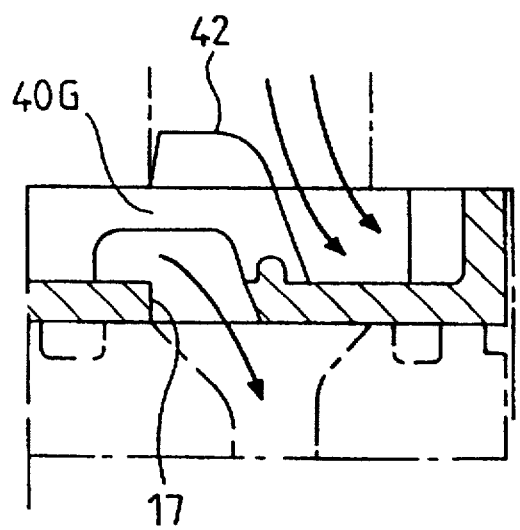
Figure 16:
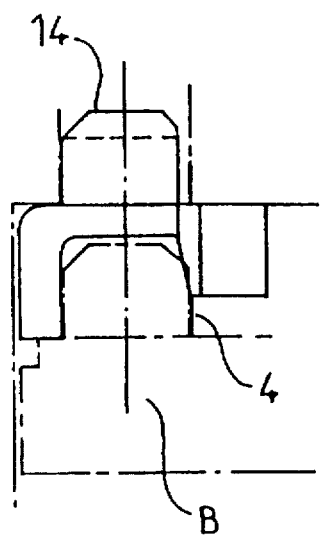

Objects, features and advantages of the invention will emerge from the following description given by way of example with reference to the appended drawings in which:

FIG. 1 is a view substantially in axial section on the broken line I—I in FIG. 2 of a mixer tap cartridge connected to the bottom of the chamber of a tap body by an adapter of the invention, shown diagrammatically in outline only, FIG. 2 is a bottom view of the mixer tap cartridge as seen in the direction of the arrow II in FIG. 1, FIG. 3 is a bottom view of a rigid part designed to constitute, with a seal of appropriate shape, the adapter from FIG. 1, FIG. 4 is a view of this rigid part in radial section on the section plane IV in FIG. 3, FIG. 5 is a view of this rigid part in radial section on the section plane V in FIG. 3, FIG. 6 is a partial view of this rigid part in radial section on the section plane VI in FIG. 3, FIG. 7 is a bottom view of the rigid part from FIG. 3 to which a first seal designed to provide direct communication has been added, FIG. 8 is a view of it in diametral section on the section plane VIII—VIII (the bottom of the cartridge being shown in chain-dotted line), FIG. 9 is a view in radial section on the section plane IX of the adapter from FIG. 7 and of the base of the cartridge (shown in chain-dotted line), FIG. 10 is a view in radial section on the section plane X of the adapter from FIG. 7 and of the base of the cartridge (shown in chain-dotted line), FIG. 11 is a view in radial section on the section plane XI of the adapter and of the base of the cartridge (shown in chain-dotted line), FIG. 12 is a bottom view of the rigid part 3 to which a second seal providing cross communication has been added, FIG. 13 is a view of it in diametral section on the section plane XIII—XIII, with the base of the cartridge shown in chain-dotted line, FIG. 14 is a view in radial section on the section plane XIV of the adapter from FIG. 7 and of the base of the cartridge (shown in chain-dotted line), FIG. 15 is a view in radial section on the section plane XV of the adapter from FIG. 7 and of the base of the cartridge (shown in chain-dotted line), and FIG. 16 is a view in radial section on the section plane XVI of the adapter from FIG. 7 and of the base of the cartridge (shown in chain-dotted line).

FIG. 1 shows in highly schematic form a reversible adapter A disposed axially between a conventional mixer tap cartridge B and the bottom of the chamber C of a conventional tap body.

As seen in FIG. 2, the cartridge B has a bottom wall incorporating two inlet orifices 1 and 2 and an outlet orifice 3. The two inlet orifices 1 and 2 are substantially symmetrical about a diameter D through the outlet orifice 3. The bottom includes locating pins 4A and 4B in the conventional manner.

This cartridge is of conventional design. It essentially comprises, above the bottom, a fixed ceramic disk 5 incorporating liquid inlet and outlet orifices, communicating with the orifices 1, 2 and 3 in the bottom wall, a mobile disk 6 including a cup and the position of which relative to the fixed disk, by virtue of this cup, determines the proportions and the quantities of cold water and hot water in the water leaving via the outlet orifice. The position of the mobile disk 6 is controlled by a lever 7 pivoting about its transverse axis Y in a tubular flange 8 that can rotate about a vertical axis. The lever 7 cooperates with a washer cover disk 9 which is attached to the mobile disk 6 for movement in translation along the fixed disk 5.

The construction of this conventional cartridge will not be described in more detail.

The chamber C of the tap body includes a wall surrounding the cartridge and a bottom wall onto which open water inlet passages C1 (only one of which is shown) and an exit passage C3, axially facing the orifices 1, 2 and 3 in the bottom wall of the cartridge.

The adapter A is designed to provide between the inlet passages and the inlet orifices either a direct connection (so that each passage communicates with the orifice axially facing it) or a crossed connection (so that each passage communicates with the inlet orifice axially facing the other passage).

The adapter includes a rigid part 10 shown in FIG. 3 adapted to cooperate with one of two seals described later, as required.

This rigid part has a bottom wall 11 surrounded by a lateral wall or skirt 12.

The wall 11 is designed to be in contact with the bottom wall of the cartridge B. It therefore includes two recesses 13 (see FIG. 6) designed to receive the centering pins 4A and 4B on the cartridge B. It further includes, axially in line with the recesses 13, centering pins 14 adapted to cooperate with recesses provided in the conventional way in the bottom of the chamber in the tap body (these recesses are not shown in order to simplify the drawing).

The wall 12 surrounds the recesses 13 and provides a base for the centering pins 14. It extends between the two recesses 13 along a small diameter arc 12A. It further extends from these pins along two sections 12B parallel to a diameter D' and then two coplanar sections 12C perpendicular to the diameter D', and finally a section 12D subtending an angle of slightly more than 180°.

Accordingly, the skirt 12 defines a cavity that is substantially symmetrical about the diameter D'.

In the narrow portion of this cavity is an orifice 15 the cross-section of which is substantially identical to that of the outlet orifice 3 in the bottom of the cartridge and which is adapted to be axially aligned with the latter. The orifice 15 is surrounded by a flange 16.

The wall 11 further includes, in the wide part of the cavity, two half-moon shape openings 17 and 18 on opposite sides of the diameter D' and on opposite sides of an imaginary semicircle 100. These half-moons are flanked by this semicircle. They are designed to be axially aligned with the inlet orifices 1 and 2 in the bottom of the cartridge and the semicircle 100 has a radius substantially equal to the distance between the center of each of the orifices 1 and 2 and the center of the bottom wall of the cartridge.

The semicircle 100 is preferably materialized by two projecting ribs 19 and 20, at least where it is radially aligned with the half-moon shape opening.

The edge of the half-moons 17 and 18 running along the semicircle 100 is advantageously bevelled, for example at 20°, being wider on the side away from the cavity.

The wall 11 advantageously further includes slots 21 and 22 disposed along the diameter D'.

FIGS. 7 through 11 show the rigid part from FIGS. 3 through 6 combined with a first seal allowing direct communication between the inlet orifices of the cartridge and the inlet passages of the chamber in the tap body.

This first seal 30 has an annular portion 30A fitting over the flange 16 around the orifice 15 in the rigid part. In practice this annular portion 30A occupies virtually all of the space between the flange 16 and the portions 12A and 12B of the skirt 12 of the rigid part.

Three radial sections 30B, 30C and 30D of the annular portion 30A merge with a peripheral portion 30E running along the side of the portion 12D of the skirt of the rigid part.

The two radial sections 30B and 30D extend substantially along a diameter perpendicular to D' and the radial section 30C runs along the diameter D'. The section 30C preferably includes ribs adapted to cooperate with the slots 21 and 22 of the rigid part.

The seal 30, located by the flange 16 and the skirt 12, therefore defines two chambers symmetrical about the diameter D' and axially aligned with the inlet passages and orifices of the cartridge and of the bottom of the chamber in the tap body (the complete cross-section of these orifices and passages is indicated in FIG. 7 by a semicircle in chain-dotted line completing the edge of the half-moons).

This procures direct communication between the inlet passages and orifices, although with a constriction, as clearly seen in FIGS. 9 and 10.

FIGS. 12 through 16 correspond to the situation in which the rigid part is associated with a second seal 40 designed to allow crossed communication between the inlet orifices and passages.

Like the first seal 30, the second seal 40 includes an annular portion 40A around the flange 16 of the rigid part and occupying most of the space between the flange 16 and the portions 12A and 12B of the skirt 12.

It similarly includes two sections 40B and 40D transverse to the diameter D' and merging with a portion 40E extending along the portion 12D of the skirt of the rigid part, subtending an angle of approximately 180°.

However, this seal 40 includes a circular arc-shape portion 40C running substantially along the semicircle 100 of the rigid part to delimit two chambers on opposite radial sides of the section 40C.

All the portions 30A through 30E of the first seal 30 have a thickness at least equal to the depth of the cavity in the rigid part to provide watertight communication between the inlet passages and orifices of the chamber and the cartridge, respectively. Likewise the portions 40A through 40E of the second seal 40.

However, the seal 40 further includes at the ends of the circumferential opening or chamber and in line with the half-moon openings 17 and 18 transverse portions or webs of varying thickness defining cups with the concave side facing the half-moons and the depth of which increases in the direction towards the other end, until these webs disappear completely.

In FIG. 12, the radially external web 40F runs along approximately one third of the angular amplitude of the circumferential opening or chamber and the radially inner web 40G runs along slightly less than half the angular amplitude of the radially inner circumferential opening or chamber.

Axially opposite the cups, the webs 40F and 40G are tangential to the edge of the portions 40B through 40D and have an angular amplitude at least equal to that of the half-moons, to provide watertight -isolation between the circumferential opening or chamber and the inlet passages in the chamber of the tap body axially in line with the half-moons. These webs guarantee that there is no direct communication.

The portion 40C advantageously includes ribs advantageously cooperating with the ribs 19 and 20 of the rigid portion to prevent the portion 40C being moved radially by different water pressures on its opposite sides.

As is clear from FIGS. 14 and 15, the portion 40C is advantageously inclined near each of the webs 40F and 40G so that it widens in the direction towards the inlet passages and in the direction towards the inlet orifices, which achieves some guidance favoring regular flow and minimizing noise.

The webs preferably further include, opposite the half-moons, centering pins 41 and 42 projecting from the edge of the portions 40B through 40E of the second seal, extending the aforementioned inclined portions on the flow passage side, improving the guidance of the flow and, bearing substantially radially against the inside wall of the flow passages, contributing to avoiding forcing of the cups into the inlet passages, with the risk of the ribs 19 and 20 on the rigid part separating from the corresponding recesses of the portion 40C, which could cause leaks at high pressures.

It goes without saying that the person skilled in the art can propose numerous variants without departing from the scope of the invention.

In FIG. 3, for example, the half-moon 18 axially aligned with the inlet orifice 2 of the cartridge is at a greater distance from the center than the half-moon 17 axially aligned with the inlet orifice 1. It is obvious that the converse configuration could be chosen without departing from the scope of the invention, with the half-moon 17 radially outside the rib 19 and the half-moon 18 radially inside the rib 20. The seal 30 would be unchanged in this case, and the seal 40 would be modified merely by interchanging the position and the orientation of the cups formed by the webs 40F and 40G relative to the diameter D'.

We claim:

1. A reversible adapter intended to be disposed between the bottom of a standard mixer tap cartridge and the bottom of a chamber of a standard mixer tap body, said bottoms conforming to a substantially circular common design, with two inlet locations symmetrically disposed about a diameter and one outlet location centered on that diameter, said locations being disposed in a globally triangular configuration, said reversible adapter including, for either direct or crossed communication between the bottom of the cartridge and the bottom of the chamber at said inlet locations and direct communication at the outlet location:

a rigid part (10) having a transverse surface (11) adapted to be in contact with the bottom of the cartridge and a skirt (12) flanking said transverse surface and adapted to extend towards the bottom of the chamber, defining a cavity, said transverse surface including, at the inlet locations, two half-moon shape openings (17, 18) respectively radially inside and radially outside a semi-circle (100) having a radius substantially equal to the distance between the center of the inlet locations and the center of the transverse surface, one of two elastic material seals, the first of which (30) includes two angularly offset chambers through its entire thickness respectively surrounding the inlet locations and the second of which (40) includes two concentric circumferential chambers on opposite radial sides of said semicircle extending angularly from one of the inlet locations to the other, each of said chambers including, at its end axially aligned with one of the half-moons, a transverse web (40F, 40G) having an angular amplitude at least equal to that of said half-moon and defining a cup facing said half-moon the depth of which increases in the direction towards the other end.

2. The reversible adapter according to claim 1 characterized in that the rigid part (11) includes ribs (19, 20) flanking the half-moon shape openings along the semicircle.

3. The reversible adapter according to claim 2 characterized in that the second seal includes, between the two concentric chambers, a semicircular portion (40C) including slots adapted to cooperate with the ribs on the rigid part.

4. The reversible adapter according to claim 1 characterized in that the half-moon shape openings (17, 18) are flanked at least along the semicircle by bevels widening in the direction away from the seal.

5. The reversible adapter according to claim 1 characterized in that the second seal (40) includes, between the two concentric chambers, a portion (40C) having near each cup disposed near each half-moon a bevel widening in the direction towards the outside of the adapter.

6. The reversible adapter according to claim 1 characterized in that the second seal (40) includes, opposite each cup, a bevel converging in the direction towards the interior of the rigid part.

7. The reversible adapter according to claim 1 characterized in that the second seal includes, axially opposite each half-moon, a projection (41, 42) the cross-section of which is at least equal to that of the half-moon and merging through an inclined surface with that of the concentric chambers communicating with the other half-moon.

8. A reversible adapter according to claim 1, the transverse surface of the rigid part being in contact with the bottom of the cartridge, the half-moon shape openings axially facing the inlet openings and the inlet passages.

* * * * *